DAVID P. EPPINGER
RICHARD L. FRANT.
INVENTOR

BY
ATTORNEY

March 17, 1970  D. P. EPPINGER ET AL  3,501,116
STRUTTED LINE-TYING DEVICE
Filed April 28, 1969  2 Sheets-Sheet 2
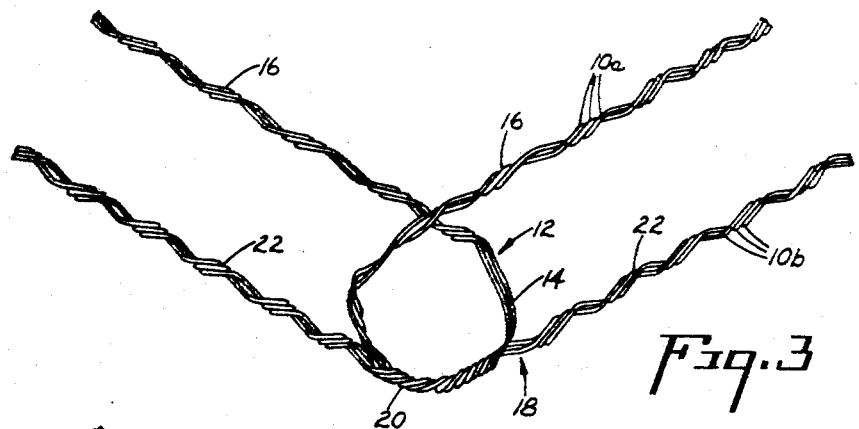
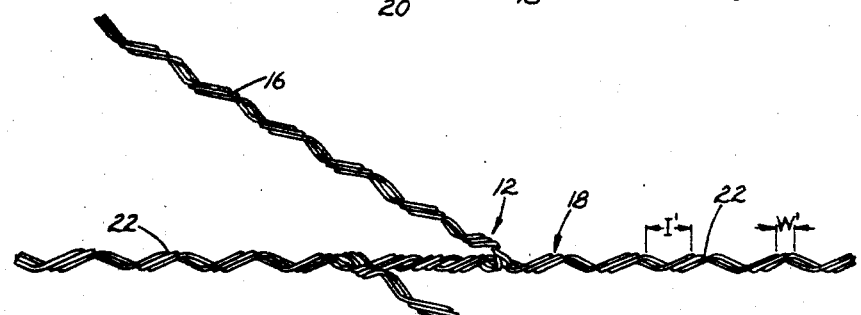
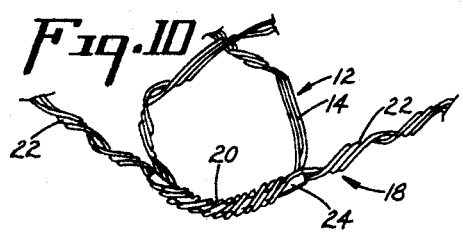
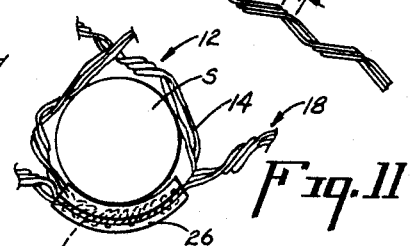
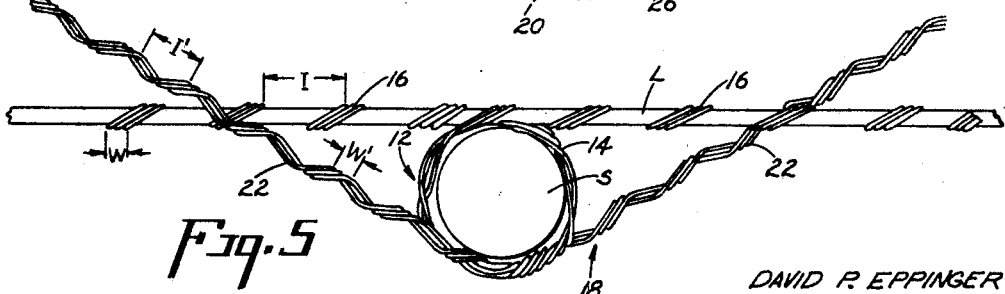
DAVID P. EPPINGER
RICHARD L. FRANTZ
INVENTOR
BY J. D. Douglas
ATTORNEY

# United States Patent Office 3,501,116
Patented Mar. 17, 1970

3,501,116
STRUTTED LINE-TYING DEVICE
David P. Eppinger, Medina, and Richard L. Frantz, Cleveland, Ohio, assignors to Textron Inc., Providence, R.I., a corporation of Delaware
Filed Apr. 28, 1969, Ser. No. 819,573
Int. Cl. H01b 17/16
U.S. Cl. 248—63                                    19 Claims

ABSTRACT OF THE DISCLOSURE

A device for tying a line to an annular support. The device includes a wrapping member and a strut member, each formed of one or more helically preformed elements. The wrapping member has a central section formed into a bight for wrappingly engaging the support and a pair of legs extending from the bight for wrappingly engaging the line on each side of the support. The strut member is engaged with the central section of the wrapping member and has a pair of arms for wrappingly engaging the line on each side of the support, and wrapped in the interval between the wraps of the legs of the wrapping member. The pitch length of the elements of the strut member, for at least a portion thereof, is different than that of the wrapping member.

---

This invention relates to improvements in means for securing suspended wire, strand or cable to or from a support, and more particularly to a device for securing a line, strand or cable to a support, which device will, when required, support high unbalanced axial loads.

The use of helically preformed elements for performing tying functions to secure lines, strands or cables (hereinafter collectively referred to as lines) to or from supports such as sheaves or insulators, has replaced hand tying and bolt type clamping devices for many applications. Examples of the use of these preformed devices are shown in U.S. Patents No. 3,127,140 and No. 3,261,581.

The devices as shown in the above-noted patents are employed for tying lines to insulators or sheaves wherein there are short spans between tying points, or other construction where unbalanced axial loads are not great, and the principal forces to be resisted are primarily transverse forces acting toward and away from the support. However, these devices are not designed for use in long span construction, such as when there may be from one to several thousand feet between tower structures, or other construction where either there is present or there is the possibility of substantial unbalanced axial loading. (As used herein, axial loading refers to stresses which are exerted on the line in a direction substantially along the axis thereof, as opposed to transverse loading which is constituted by stresses substantially normal to said axis.)

Unbalanced axial loading can be caused by unequal span lengths, unequal icing of wires on opposite sides of a given tower, storm effects, and many other factors. On short spans, unequal loading due to these factors often does not result in excessive unbalance and, hence, the devices of the above-noted patents are well adapted for performing the tying functions. However, in long spans of spans at high loads, these forces often result in substantial unequal axial loads beyond the axial holding capabilities of the devices in the above-noted patents. This results in slipping of the cable with respect to the device, a phenomenon known as "pull through."

There are several prior art proposals for providing line tying devices which will withstand substantial unequal axial loading without allowing cable pull through. One prior art proposal provided a pair of identical helically preformed members, each of which was comprised of a plurality of helically preformed elements in side-by-side relationship. These members were designed to be bent at the job to various looped configurations and applied to the line and the support. These devices are illustrated in U.S. Patent No. 2,947,504 dated Aug. 2, 1960. Although these could be bent to different looped configurations, each configuration included the intertwisting of one leg segment with another leg segment on the line for gripping engagement. Each of these leg segments was so constituted that the interval between the wraps on one leg segment was substantially equal to the width of the wraps of the other leg segment. This, of course, resulted in the wraps of each leg segment completely filling the intervals between the wraps of the other leg segment.

These prior art proposals have not proved to be satisfactory. One of the serious drawbacks of these devices is that in looping the elements around the support, there is a tendency for the wraps of the two leg segments of the tie which are supposed to be intertwisted with each other on the line, to present themselves in an "in phase" relationship with each other, i.e., when the devices are being applied to the line and the support, the wraps of the leg segments interfere with each other, preventing their being wrapped on the line. This makes it extremely difficult, if not impossible, to intertwist the wraps of the leg components of the tie on the line. Because of the difficulty of having to bend devices at the site, and because of the difficulty of intertwisting the leg components, these devices have proved quite unsuccessful.

Another prior art device designed to provide increased resistance to pull through and provide additional longitudinal holding power is shown and described in United States Patent No. 3,347,980, dated Oct. 17, 1967. In this patent, a device similar to the devices shown in said Patents No. 3,127,140 and No. 3,261,581 is provided as the basic element. In addition, a stabilizing member made of a piece of hard twist strand is provided which extends both ways from the center of the bight to the line and extends longitudinally along the line. The legs of the holding device are wrapped around both the line and the additional strand. This device does provide certain additional holding power against unbalanced axial loading. Hence, this device is an improvement, but it has certain limitations.

Firstly, while this device is much easier to install than the prior art devices, which were difficult or impossible to install, a certain substantial amount of skill and dexterity is required on the part of the lineman installing the device to accurately align it. Also, while this device does provide an increase in the resistance to unbalanced axial loading to a certain degree, as compared to the device of Patents No. 3,127,140 and No. 3,261,581, there are still certain situations in which the axial loading is unbalanced to such an extent or such a magnitude that even this improved device is not completely satisfactory to prevent pull through.

Accordingly, one of the principal features of this invention is the provision of a device for securing a line to a support which has excellent resistance to unbalanced axial loads and which can be readily and easily installed by workmen.

These and other features, together with a fuller understanding of the invention, may be had by reference to the following description taken in conjunction with the accompanying drawings in which:

FIG. 3 is an elevational view of the line securing device of this invention formed from two sets of elements bent and intertwisted;

FIG. 4 is a plan view of the device of FIG. 3;

FIG. 5 is an elevational view of the device of this invention partially installed to secure a line to an insulator;

FIG. 10 is an elevational view of a portion of another embodiment of the device of the present invention; and FIG. 11 is an elevational view of a portion of yet another embodiment of the device of the present invention wrapped around a sheave.

Briefly, the present invention contemplates the provision of a device for securing a line to a support, which device includes a wrapping member and a strut member. Each of the members is comprised of one or more rods or wires helically preformed to a specific internal diameter. The wrapping member is bent to form a bight portion which is adapted to encircle a support. A pair of legs extend from the bight portion, which legs wrappingly engage a line and extend along the line in opposite directions.

The strut member has a central section, which is intertwisted with the bight of the wrapping member, and a pair of arms extending in opposite directions. The arms of the strut are wrapped on the line intertwisted between the wraps of the legs of the wrapping member.

In order to provide for proper intertwisting and phasing of the arms of the strut member, with respect to the legs of the wrapping member, the pitch length of the elements in the wrapping member is different from the pitch length of the elements in the strut member. Also, the interval between the wraps of the arms of the strut is greater than the width of the wraps of wrapping member, and the interval between the wraps of the legs of the wrapping members is greater than the width of the wraps of the arms of the strut member.

Figure 6:
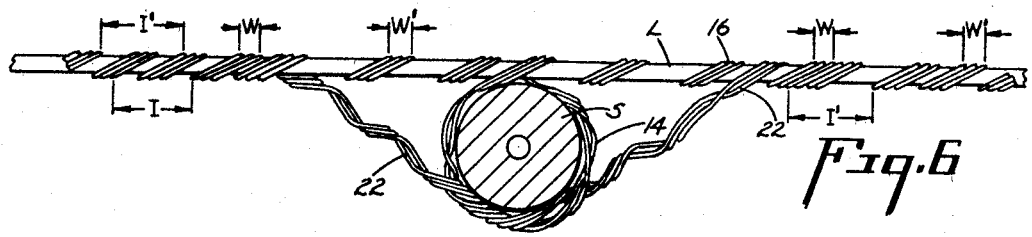
FIG. 6 is an elevational view of the completed installation of a line securing device of this invention.
Figure 7:
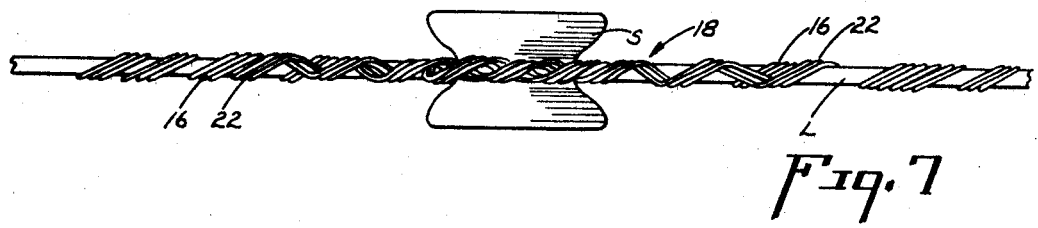
FIG. 7 is a bottom plan view of the installed device as shown in FIG. 6.
Figure 1:
FIG. 1 is an elevational view of a helically preformed wire element used in forming the line tie of this invention.

Referring now specifically to the drawings, the tying device of this invention is comprised of helically preformed wire or rod elements 10, such as are shown in FIG. 1. Preferably, these elements are formed of hard drawn wire and are helically preformed to a given pitch length and internal diameter. Normally, both the strut member and the wrapping member will be formed of a plurality of these elements, and to form this plurality, the elements are formed into a set as shown in FIG. 2.

Figure 2:
FIG. 2 is an elevational view of a plurality of the elements of FIG. 1 laid up in a set.

Referring now to FIG. 3, a side elevational view of a line tying device formed from two sets of helical elements of the type shown in FIG. 2 is shown. The device includes a first set of elements 10a, bent to form wrapping member designated generally as 12. The wrapping member 12 is bent to form a bight portion 14, with a pair of legs 16 extending therefrom. As can be seen in FIG. 3, the bight portion is constituted by a loop of a full 360 degrees, and as can be seen in FIG. 4, the legs 16 diverge laterally with respect to each other.

The device also has a second set of helical elements 10b bent to form a strut member 18. The strut 18 includes a central portion 20 and a pair of arms 22 extending in opposite directions therefrom. The central portion 20 of the strut member 18 is arched, and the middle thereof is intertwisted with a portion of the bight 14 of the wrapping member 12.

In the manufacture of the gripping device, the helical elements 10a of the wrapping member 12 are formed with a pitch length which is different from the pitch length of the helical elements 10b of the strut member 18. (The pitch length is the axial distance of one complete revolution of a preformed helical element. By providing this differential pitch length, the problem of interference by "in phase" relationship of the leg and arm components can be overcome, as will be explained presently.

Also, in order to allow for the intertwisting of the wraps of the arms and legs on the line, the size and number of elements, and the pitch length of the elements forming the wrapping member 12 and strut member 18, are so selected that the interval I between wraps of the legs 16 will be greater than the width W' of the wraps of the arm 22 and also so that the interval I' between the wraps of the arm 22 will be greater than the width W of the wraps of the legs 16. The determination and selection of pitch length differential and interval distance will be discussed presently.

The device of FIGS. 3 and 4 is shown in FIG. 5 being applied to a line and support. As can be seen in FIG. 5, the bight section 14 of the wrapping member 12 is wrapped around a support S. The support is shown as a sheave having a generally cylindrical external surface. However, this support may be an insulator or any one of many common types of supports for engaging a line.

The legs 16 of the wrapping member 12 extend in opposite directions from the support in wrapping engagement with the line L. This is the first step in the application of the device.

It will be apparent that, to wrap the legs 16 around the line L, they must be bent into axial alignment with each other from the diverging position shown in FIG. 4. This bending is within the elastic limit of the wrapping member, and such distortion provides a great deal of force to securely engage and hold the line in the desired position and prevent lateral movement of the line with respect to the support S.

Next, each of the arms 22 of the strut member 18 is wrapped around the line L with the wraps thereof intertwisted between the wraps of one of the legs 16 of the wrapping member 12. The provision of the strut member in this manner provides a great deal of additional resistance to pull through the line due to unbalanced axial loading thereby resisting movement of the line in a direction generally on a path coincident with the axis of the line L. Thus, the wrapping member 12 provides the necessary resistance against lateral movement of the line with respect to the support S. The strut member 18, in combination with the wrapping member 12, in the particular configuration applied to the line, prevents pullout due to unbalanced axial loading. Also the strut, when applied provides additional resistance against unwanted lateral movement. Thus, a superior line tie is formed.

Figure 8:
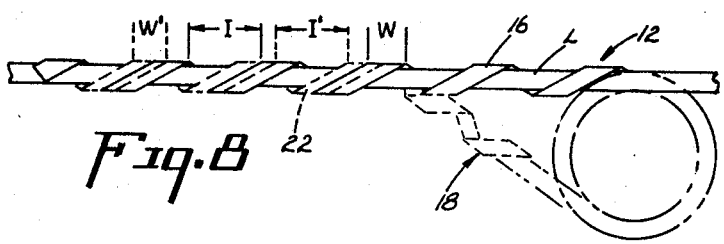
FIG. 8 is a diagrammatic representation of the interference encountered of the arms of a strut member with the legs of the wrapping member when both are formed of the same pitch length indicating how the device will not work when so formed.
Figure 9:
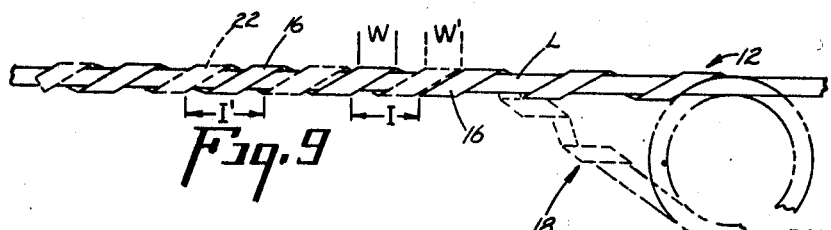
FIG. 9 is a diagrammatic representation of the intertwisting of the arms of the strut member with the legs of the wrapping member on the line when the differential pitch length is used.

The problem of phase interference, and how different pitch length and wide interval overcome this problem, is shown diagrammatically in FIGS. 8 and 9. FIG. 8 is a diagrammatic representation depicting how the legs and arms of the wrapping member and strut member interfere or overlap with each other in a condition known as phase interference, when the pitch length of the helices of the wrapping member is the same as the pitch length of the helices of the strut member. In FIG. 8, the wraps of the legs of the wrapping member 12 are shown in solid lines, and the wraps of the arms of the strut member are shown in dotted lines. As can be seen, the arms of the strut member tend to fall at the same locations as the legs of the wrapping member. This prevents their being intertwisted with each other. This overlap does not always strike at exactly the center, that is, there is not always exactly zero degree phase relationship. However, it has been found that the phase relationship is close enough to being "in phase," that it usually provides interference between the legs and the arms of the respective members and thus prevents them from being applied in intertwisted relationship.

The exact reason for this interference is not completely understood. However, it is believed that it is related to the fact that the wrapping member is necessarily provided with a central looped configuration wrappingly engaging the support, and because of this geometry and the strut position, the inherent result is for the helices to be "in phase" with each other if the pitch lengths are the same.

In order to overcome the problems of phase interference, the two members are formed with different pitch lengths. If different pitch lengths are selected, it is then possible to have the arms of the strut member reach the line in an "out-of-phase" condition with respect to the legs of the wrapping member. This "out-of-phase" condition is shown diagrammatically in FIG. 9 where again the solid lines represent the helices of the legs of the wrapping member, and the dotted lines represent the helices of the arms of the strut member.

As can be seen in FIG. 9, the difference in pitch length between the two members has been selected such that a wrap of the arm of the strut member 18 starts engagement with the line L immediately adjacent a wrap of the leg 16 of the wrapping member 12. As this wrapping of the arms and legs in intertwisting relationship continues along the line in both directions, the relative position of the arms of the strut member and the legs of the wrapping member on the line changes somewhat. In the case illustrated in FIG. 9, the pitch length of the strut member is longer than the pitch length of the wrapping member. Hence, at successive wraps the position of the arms shifts from a location adjacent the wrap of the leg to a position centrally of the two wraps of a leg and then to a position closely adjacent the next successive wrap. From this showing the second requisite is apparent, i.e., that the interval I between the wraps of the legs 16 must be greater than the width W' of the wraps of the arms 22, and also the interval I' between the wraps of the arm 22 must be greater than the width W of the wraps of the legs 16. From an examination of the diagrammatic showing, it can be seen that the interval between the wraps must be sufficient to accommodate the change in relative position of the wraps of the arms and legs to the extent that they "run out" on the line.

The minimum interval (I min.) between the wraps of each of the arms and legs can be expressed by the equation I min. $= W + N \times dPL$, wherein W is the width of the wraps to be intertwisted in the interval, N is equal to the number of wraps to be intertwisted on each side, and $dPL$ is the difference between the pitch lengths of the two elements.

The width of the wraps and the number to be intertwisted are normally determined by the amount of holding power that must be developed. Normally, with a multiple wire device, it is necessary that there be at least two pitch lengths intertwisted on each side to develop the desired holding power. Usually, there need not be more than 5 pitch lengths intertwisted on each side.

The difference in pitch length need not be great in order to prevent this phase interference. In most instances, this difference will be of the order of magnitude of from .15 inch to .35 inch, although special situations may dictate more or less difference.

Once the width of the wraps and the number of pitch lengths to be intertwisted are selected to generate the required holding power, and the difference in pitch length has been chosen, the minimum interval can be easily calculated.

It is to be understood that the equation above shows the theoretical minimum interval that is necessary. However, their theoretical minimum would require the wraps of the arm and the legs to start engagement with the line exactly adjacent each other and that the number of pitches to be intertwisted be exact. This extreme precision usually cannot be obtained. However, even if such were obtainable, it would not be desirable from a field application standpoint to design to this minimum because of the possibility of several installation problems. One of such problems is that encountered with different sag angles of the line with respect to the difference. The sag angle is that angle subtended by the line with the support when it is resting on the support with different angles, the placing of the wraps of the arm of the strut and the legs of the wrapping member whereby start engagement with the line will be slightly different. Hence, the interval should be somewhat more than this calculated minimum.

The above equation can be rearranged and used to solve the limiting values of any one of the unknowns if the other values are known. For example, if the width of the wraps, the difference in pitch length, and the desired interval are known, the maximum number of wraps that can be intertwisted is expressed by the equation, $$N \text{ max.} = \frac{I - W}{dPL}$$

Other rearranging of the equation for calculating maximum pitch length difference and maximum wrap widths are readily apparent as follows:

$$dPL \text{ max.} = \frac{I - W}{N}$$

and $$W \text{ max.} = I - N \times dPL$$

Also, it will be apparent that the equations can be used not only to determine specific limiting factors in developing a design, but also to test whether any given final design is feasible.

As was indicated above, the drawing in FIG. 9 shows the case of the strut member having a pitch length slightly longer than that of the wrapping member. It is to be understood, however, that this could be reversed with the strut member having a pitch shorter than the pitch length of the wrapping member.

Further, the devices shown have utilized two members each which have a different pitch length, but the pitch length of each is constant throughout. From the manufacturing standpoint, this is desirable and preferred where a proper design can be developed. However, it is not necessary that the entire length of each member be formed to a constant pitch length. In fact, from a design point of view, it may be desirable that the wraps of the arms and legs that are intertwisted on the line have the same pitch length to avoid change in phase with respect to each other on the run-out on the line as described above. In such a case, only a portion of one of the members may be formed with a pitch length different from the pitch length of the other. For example, the strut member can be formed with a pitch length different from that of the wrapping member only at that portion between the locations which the arms engage the line, with the pitch length of the arms of the strut member being the same as that of the legs of the wrapping member. In fact, the difference in pitch length between the strut member and the wrapping member could be limited just to that portion of the strut between where it engages the wrapping member centrally thereof and where the legs and arms thereof engage the line. In fact, theoretically, the difference in pitch length could be confined to a single pitch length or less thereof.

Even in these cases, the interval between the wraps at the arms of the strut member wrapped on the line should be greater than the width of the wraps of the legs of the wrapping member, and similarly the interval between the wraps of the legs of the wrapping member wrapped on the line should be larger than the width of the wraps of the arms of the strut member. This will allow for application on lines at different sag angles, and prevent other installation problems as described above.

Another technique for providing a differential pitch length is by cabling in a tight twist the center section of one of the members, preferably the strut member. The twisting operation can be performed so that the resultant pitch length at the twisted portion is different. Again the entire lengths of both members can be of different pitch length, or just the cabled portion may be different with the legs and the arm being the same.

The central section of the noncabled member is wrapped around the cabled section of the other member. However, this configuration does not provide as good holding power as where the wraps of the helices of the two members are intertwisted centrally.

Another modification of the device is shown in FIG. 10. In this embodiment the central portion of the bight section 14 of the wrapping member 12 and the central portion 20 of the strut member 18 are wrapped onto a core piece 24 at the position where they are intertwisted together. This core piece should be relatively flexible and preferably can be formed of a length of plastic rod or tube or a piece of strand. The purpose of this core piece is to help maintain the wrapping member and strut member in proper position during shipping and installation. By providing a positive surface which the members can be wrapped on and grip, they will be maintained in their proper relative position for application to the line.

As shown, the core member 24 is co-extensive with the intertwisted portions of the two members. However, the core could be shorter or even longer and extend either into the legs of the strut member or farther around the bight of the wrapping member.

Yet another modification of the device of this is shown in FIG. 11 wrapped around a sheave. In this embodiment a split resilient sleeve member 26, formed of neoprene or other elastomeric material such as rubber, is provided, wrappingly engaging the central portion of the bight section 14 of the wrapping member 12 and the central portion 20 of the strut member 18 where they are intertwisted together. This provides a resilient cushion or pad between the sheaves S and the members where they are intertwisted. Such padding is desirable if the device does not fit extremely snugly around the sheave and is subject to vibrational stresses. In such cases, the helical elements tend to fail when they are intertwisted, and also they tend to mar or score the sheave. As a practical matter, the larger sheaves tend to have looser fits, and hence it is in such larger sheaves where this configuration is desirable.

It is understood that resilient padding can take forms other than a split sleeve, i.e., a strip of resilient material could be interposed between the sheave and the members. However, the split sleeve is easy to apply and will stay in place during handling, shipping, and the application of the device, and hence is the preferred form.

As illustrated in the various embodiments, the strut members and the wrapping member each have the same number of helically formed elements of the same diameter. However, a different number of elements could be used for the strut member than for the wrapping member and elements of different sizes for the two members could be used. Normally, however, design considerations will dictate that the same size and number of elements will be used for both the strut and the wrapping member.

Also, it is contemplated that the individual elements of each of the members can be adhesively bound together. A friction enhancing material, such as alumina or other grit, may also be applied to the elements to increase their holding power.

Further, as was indicated above, it is prefered that a plurality of elements be utilized for forming each of the wrapping members and the strut members. However, it is possible that a single element could be utilized for one or both of these members.

We claim:
1. A device for securing a line to a support, comprising a wrapping member and a strut member, each of said members including at least one element helically preformed to an open pitch at least at the ends thereof and capable of being applied to a linear body without permanent deformation, said wrapping members being bent intermediate deformation, said wrapping member being bent intermediate its ends to form a bight portion and a pair of legs extending from said bight portion, said bight portion of said wrapping member being adated to circumferentially engage the support with the legs thereof extending in opposite directions for wrappingly engaging a line, said strut member having a central portion disposed in engagement with the bight portion of the wrapping member and a pair of arms extending from said central portion, the pitch length of the helix of at least a portion of one of the members being different than at least a portion of the other, the interval between the wraps of the arms of the strut member being greater than the width of the wraps of the legs of the wrapping member, and the interval between the wraps of the legs of the wrapping member being greater than the width of the wraps of the arms ofthe strut members, whereby to permit the ends of the arms of the strut member and the legs of the wrapping member to be applied to the line intertwisted with each other.

2. The invention as defined in claim 1 wherein there are a plurality of elements forming at least one of said members.

3. The invention as defined in claim 1 wherein the legs of the wrapping member diverge laterally prior to application to the line.

4. The invention as defined in claim 1 further characterized by resilient padding means operatively associated with said members where the members are engaged and positioned to be interposed between the members and the support.

5. The invention as defined in claim 4 wherein said resilient adding includes sleeve means wrappingly engaging said members.

6. The invention as defined in claim 1 wherein each of said members is open helical pitch throughout its length, and said engagement of the central portion of the strut member and the bight of the wrapping member is by intertwisting.

7. The invention as defined in claim 6 wherein the pitch length of the two members is different, at least in that portion of the wrapping member between the legs where they are to be applied to the line and in that part of the strut member between the arms where they are to be applied in the line.

8. The invention as defined in claim 6 wherein the pitch length of the two members differ throughout their lengths.

9. The invention as defined in claim 8 wherein the interval between the wrap of the helices of each of the members is at least equal to $W + N \times dPL$ wherein W is the width of the wrap to be intertwisted, N is the number of wraps of each arm and leg to be intertwisted, and $dPL$ is the difference in the pitch lengths.

10. The invention as defined in claim 6 further characterized by a core piece, and said members being wrappingly engaged on said core piece where said members are intertwisted.

11. The combination of a line and a supporting structure comprising, a line, a support device and a tying device, said tying device including a wrapping member and a strut member, each of said members including at least one element helically preformed to an open pitch at least of the ends thereof and capable of being applied to a linear body without permanent deformation, said wrapping member being bent intermediate its ends to form a bight portion and a pair of legs extending from said bight portion, said bight portion of said wrapping member circumferentially engaging the support device with the legs thereof extending in opposite directions wrappingly engaging the line, said strut member having a central portion engaging the bight portion of the wrapping member and a pair of arms extending from said central portion wrappingly engaging said line intertwisted between the wraps of the legs of the wrapping member, the pitch length of the helix of at least a portion of one of the members being different than at least a portion of the pitch length of the helix of the other, and the interval between the wraps of the arms of the strut member being greater than the width of the wraps of the legs of the wrapping member, and the interval between the wraps of the legs of the wrapping members being greater than the width of the wraps of the arms of the strut member.

12. The invention as defined in claim 11 wherein there are a plurality of elements forming at least one of said members.

13. The invention as described in claim 11 further characterized by resilient padding means disposed between said members and said support at a location where the members are engaging each other.

14. The invention as described in claim 13 wherein said padding means includes sleeve means wrappingly engaging said members.

15. The invention as defined in claim 11 wherein each of said members is of open helical pitch throughout its length and said engagement of the central portion of the strut member and the bight of the wrapping member is by intertwisting.

16. The invention as defined in claim 15 wherein the pitch length of the two elements is different at least in that portion of the wrapping member between the legs where they are applied to the line and in that part of the strut member between the arms where they are applied in the line.

17. The invention as defined in claim 15 wherein the pitch length of the two members differ throughout their lengths.

18. The invention as defined in claim 17 wherein the interval between the wrap at the helices of each of the members is at least equal to $W+N \times dPL$ wherein W is the width of the wrap to be intertwisted, N is the number of wraps of each arm and each leg to be intertwisted, and dPL is the difference in the pitch lengths.

19. The invention as defined in claim 15 further characterized by a core piece, and said members wrappingly engaging said core piece where said members are intertwisted.

References Cited
UNITED STATES PATENTS

| | | | |
|---|---|---|---|
| 2,202,538 | 5/1940 | Selquist | 174—42 |
| 2,943,135 | 6/1960 | Bertling | 174—79 X |
| 2,947,504 | 8/1960 | Ruhlman | 248—63 |
| 3,127,140 | 3/1964 | Quayle | 248—63 |
| 3,183,658 | 5/1965 | Peterson | 57—145 |
| 3,261,581 | 7/1966 | Little et al. | 248—63 |
| 3,288,918 | 11/1966 | Schlein | 174—173 |
| 3,347,980 | 10/1967 | Reese | 174—173 |
| 3,455,099 | 7/1969 | Butz | 174—79 X |

LARAMIE E. ASKIN, Primary Examiner

U.S. Cl. X.R.

24—131; 174—173

PO-1050
(5/69)

UNITED STATES PATENT OFFICE
CERTIFICATE OF CORRECTION

Patent No. 3,501,116      Dated March 17, 1970

Inventor(s) David P. Eppinger and Richard L. Frantz

It is certified that error appears in the above-identified patent and that said Letters Patent are hereby corrected as shown below:

Column 4, line 3, a close parenthesis sign --)-- should follow "element".

Column 6, line 6, after "support" (second occurrence) insert a period --.--; same line, delete "with" and insert --With--; line 7, delete "placing of" and insert --place where--; line 8, delete "whereby".

Column 7, line 41 "sheaves" should read --sheave--.

Column 8, lines 7 and 8, delete "said wrapping members being bent intermediate deformation,"; line 11, "adated" should read --adapted--; line 24, "members" should read --member-- line 40, "adding" should read --padding--; line 71, "of" (first occurrence) should read --at--.

Column 9, line 14, "members" should read --member--.

Column 10, line 7, "wrap at" should read --wraps of--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents